United States Patent
West et al.

[15] 3,658,011

[45] Apr. 25, 1972

[54] COIL CAR

[72] Inventors: Curtis C. West, Lansing, Mich.; Louis D. Castello, Valencia; Frederick William Allan Ward, Elwood City, both of Pa.

[73] Assignee: Planet Corporation

[22] Filed: Nov. 6, 1969

[21] Appl. No.: 874,619

[52] U.S. Cl. .................................................105/367, 105/96
[51] Int. Cl. .................................................B60p 3/00
[58] Field of Search ............. 105/367, 96; 248/119; 296/4, 296/28; 104/149, 153, 177

[56] References Cited

UNITED STATES PATENTS

| 35,244 | 5/1862 | McNair | 105/215 R |
|---|---|---|---|
| 398,040 | 2/1889 | Grace | 105/215 R |
| 881,387 | 3/1908 | Eastwood | 104/148 R |
| 3,147,715 | 9/1964 | Myers | 105/367 |
| 3,242,879 | 3/1966 | Bronlund | 105/367 |
| 3,244,117 | 4/1966 | Yuhas | 105/95.1 |
| 3,322,457 | 5/1967 | Toadvine | 105/367 |
| 3,481,627 | 12/1969 | Felburn | 105/369 A |

Primary Examiner—Drayton E. Hoffman
Attorney—Miller, Morriss, Pappas & McLeod and George P. Pappas

[57] ABSTRACT

A rail type coil car for transporting and handling heavy coils of rolled material consisting of a substantially U-shaped coil support frame which is mounted on forward and rear bolsters and wheel trucks. Spaced-apart coil support shoulders are provided on the coil support frame which permit banding of the coils while they are in position upon the coil car. Spaced-apart self-adjusting resilient shock pads for supporting steel coils of different sizes are provided on each of the coil support shoulders of the coil support frame. A pin suspension system on the bolsters and wheel trucks provides full eight wheel contact on the rails at all times, regardless of track condition. Cam follower rollers are positioned ahead of the leading wheels of each wheel truck so as to lead the coil car through short radius turns with a minimum of wear upon the rails and wheels. Each forward set of wheels is driven by an individual motor drive. The armatures of the dual motor drives are series connected to provide an electrical differential action as the car moves around a turn. The coil car is electrically powered from an underground power rail system and is adapted to move on a surface track system between remote locations. A safety bumper bar is provided on the front of the rail car which automatically stops the coil car upon contact with any obstruction on the tracks or upon contact with the rear of another coil car.

8 Claims, 8 Drawing Figures

INVENTORS
CURTIS C. WEST
LOUIS D. CASTELLO
BY FREDERICK WILLIAM ALLAN WARD

Miller, Morris, Pappas & McLeod
ATTORNEYS

PATENTED APR 25 1972
3,658,011
SHEET 4 OF 5
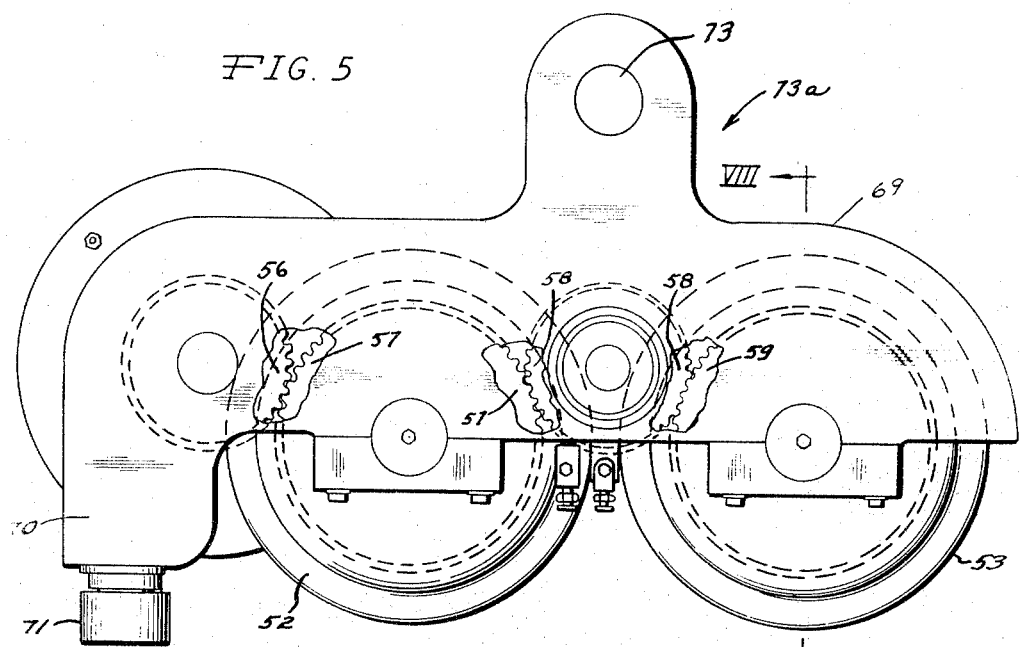
FIG. 5
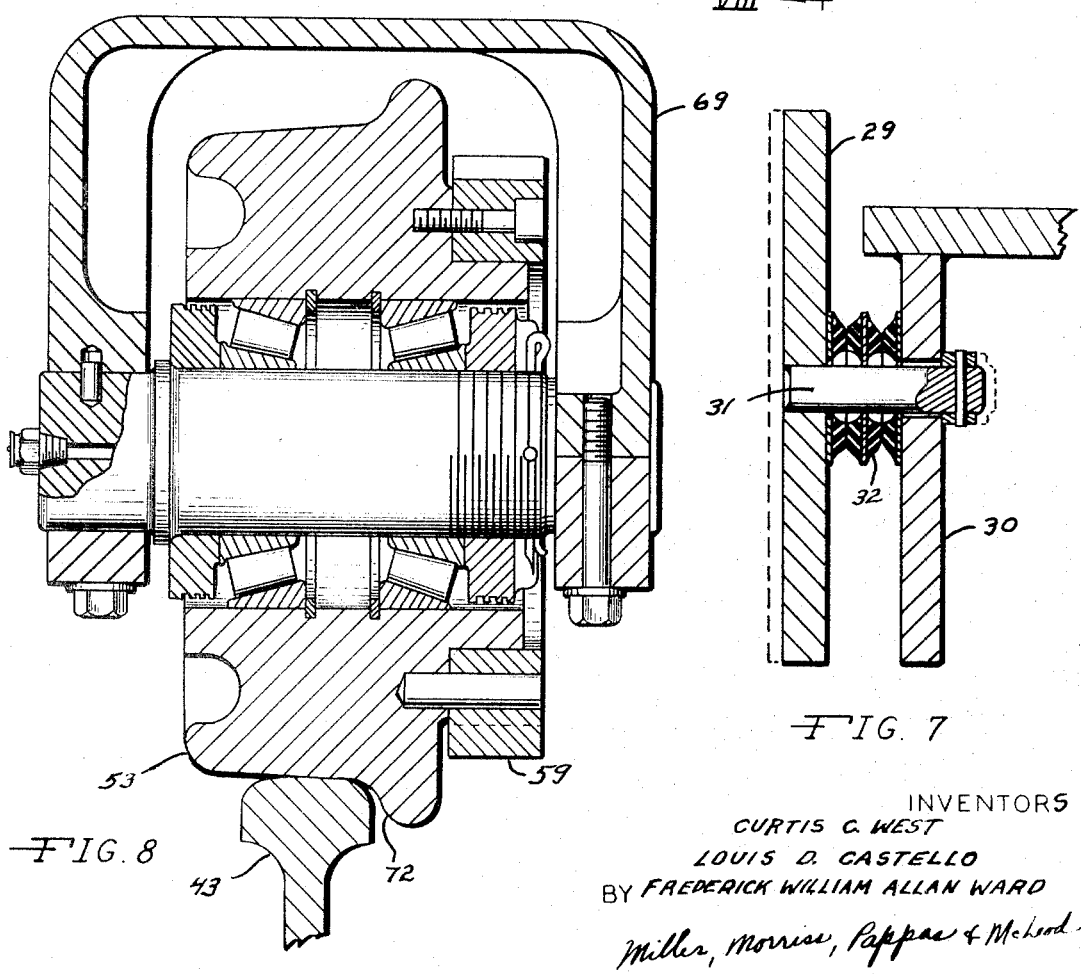
FIG. 8
FIG. 7
INVENTORS
CURTIS C. WEST
LOUIS D. CASTELLO
BY FREDERICK WILLIAM ALLAN WARD
Miller, Morriss, Pappas & McLeod
ATTORNEYS

INVENTORS
CURTIS C. WEST
LOUIS D. CASTELLO
BY FREDERICK WILLIAM ALLAN WARD

Miller, Morissa, Pappas, McLeod
ATTORNEYS 3,658,011

COIL CAR

SUMMARY OF THE INVENTION

This invention relates to a rail type coil car which is adapted to handle coils of rolled steel which can weigh up to 100,000 pounds or more. The configuration of the rail type coil car permits banding or unbanding of such coils after they have been loaded on to the coil car, thus eliminating separate handling of the coils for the banding and unbanding steps.

More specifically, this invention relates to a coil car which can selectively be electrically, battery or gasoline powered and which can selectively be automatically controlled so as to receive, handle and transport steel coils on a track system in any desired pre-determined manner.

This invention further relates to a unique industrial coil car system for the handling and transport of heavy coils of rolled steel with economy and with use of a minimum of plant space through elimination of overhead or floor-mounted conveyors. A plurality of coil cars are provided on a track system which includes spurs and stop stations therealong. The coil cars are self-powered and move along the track rails provided in the floor. In the instant embodiment of the invention, electrical energy is supplied through a slot in the floor. The underground power source runs adjacent the rails and the contact therewith is made through a mast which extends downwardly from the coil car. If desired, the coil cars can be battery or gasoline powered. Further, the cars can be adapted to move automatically around the track system by use of a programmed computer operation. In addition to use on a closed loop rail system, the cars can be sequenced to operate between locations in a reciprocating manner.

The coil cars of the instant invention can also be provided with wheels for use independently of a track system.

The configuration of the coil support frame can be changed so that the centerline of the U-shape form is at an angle to or parallel to the direction of travel of the car. The configuration of the coil support frame can also be adapted to handle stacks of flat sheet material as well as coiled material.

The coil car of the instant invention permits unlimited horizontal movement of the axis of the coil being transferred without handling of the coil itself. Thus, a unique coil car is provided which has the ability to economically link remote operations located in separate locations and which has the ability to negotiate sharp turns in the car route previously not negotiable by regular conveyor systems.

The handling of coils of rolled steel has heretofore been beset with many problems. The heavy weight of such coils has required the use of complicated and heavy ancillary equipment to lift the coils through separate handling, banding, unbanding, weighing and transport steps. In addition to the requirement for expensive ancillary handling equipment, the old methods of handling such coils have required plant space which could have been used more advantageously for productive work.

A need has therefore existed for a unique rail type coil car and an associated track system for handling and transporting heavy coiled or stacked material which is economical, trouble-free and which frees plant space for other uses by the elimination of conveyors and other ancillary transfer, loading, banding, unbanding, weighing and unloading structures.

It is therefore an object of this invention to provide a unique rail type coil car which can carry heavy coils of rolled material or stacks of sheet material.

Another object of this invention is to provide a rail type coil car which is configured to permit banding or unbanding of the coil without the necessity of removing or lifting the coil from its rest position on the coil car.

Yet another object of this invention is to provide a coil handling apparatus and system which eliminates the need for overhead or floor mounted conveyors, thus resulting in space savings in the plant and original equipment cost savings.

Another object of this invention is to provide a coil steel handling system comprised of a plurality of coil cars operating on a track system.

Another object of this invention is to provide a material handling car which allows weighing of the material being transferred while the car is in transit or is stationary.

Yet another object of this invention is to provide a coil steel handling system having flexibility in use because the number of cars being utilized can be varied depending on production rates.

A still further object of this invention is to provide a coil car which utilizes a dual electro-mechanical drive which eliminates the use of mechanical differentials.

Yet another object of this invention is to provide a coil car which is provided with energy absorbing shock pads to prevent damage to car bearings or to the material being carried.

Another object of this invention is to provide energy absorbing, resilient shock pads which are self-adjusting to support coils of different diameters.

Still another object of this invention is to provide a coil car having a pin joint suspension system which insures full eight wheel contact on the rails at all times.

Another object of this invention is to provide a coil car having cam follower rollers which "lead" the coil car around turns, thus minimizing wear between the rails and wheel flanges and which allow the coil car to make a smaller radius of turn.

Another object of this invention is to provide a coil car which can be provided with wheels for travel independent of a track system and which can be electrically, battery and gasoline powered as desired.

Yet another object of this invention is to provide coil cars and a coil car track system which are adapted to be electrically sequenced for automatically moving the coil cars through a series of predetermined work stations.

Other objects and advantages found in the construction of our invention will be apparent from a consideration of the following specification in connection with the appended claims and the accompanying drawings.

In the drawings:

FIG. 5 is a side elevation view of one of the forward wheel trucks showing the cam follower roller mounted thereon and further illustrating the wheel drive system.

FIG. 7 is a cross-sectional view of one of the shock absorber pads taken on line VII — VII of FIG. 1.

FIG. 8 is a cross-sectional view of one of the wheel assemblies taken on line VIII - VIII of FIG. 5.

GENERAL DESCRIPTION

In general, this invention consists of a rail type coil car having a substantially U-shaped coil support frame. The U-shaped configuration of the coil support frame permits side-loading of coils of rolled steel onto the coil car directly from C-cars or other transfer devices which carry such coils.

Further, the U-shaped coil support frame is provided with forward and rear spaced apart coil support shoulders which are configured to permit the banding or unbanding of the coil of rolled steel in its rest position on the coil car without the necessity of handling or moving such coil.

Pairs of spaced-apart self-adjusting resilient shock pads provided on the forward and rear support shoulders permit the loading and supporting of different sizes of coils of rolled steel on the coil car.

The coil car is provided with forward and rear bolsters which have support wheel truck assemblies which engage the rails of a rail system. In the preferred embodiment of the invention, the coil car is electrically powered from an underground power rail system. A pair of individual motor drives drive each set of wheels provided on the forward bolster of the coil car. The individual motor drives are connected in series so as to provide an electrical differential action as the car moves around a turn or curve in the rails or track.

A plurality of such coil cars can be provided on a track system to provide a flexible coil transport system whereby the number of coil cars utilized and speeds thereof can be varied in response to varying production rates.

SPECIFIC DESCRIPTION

Figure 1:
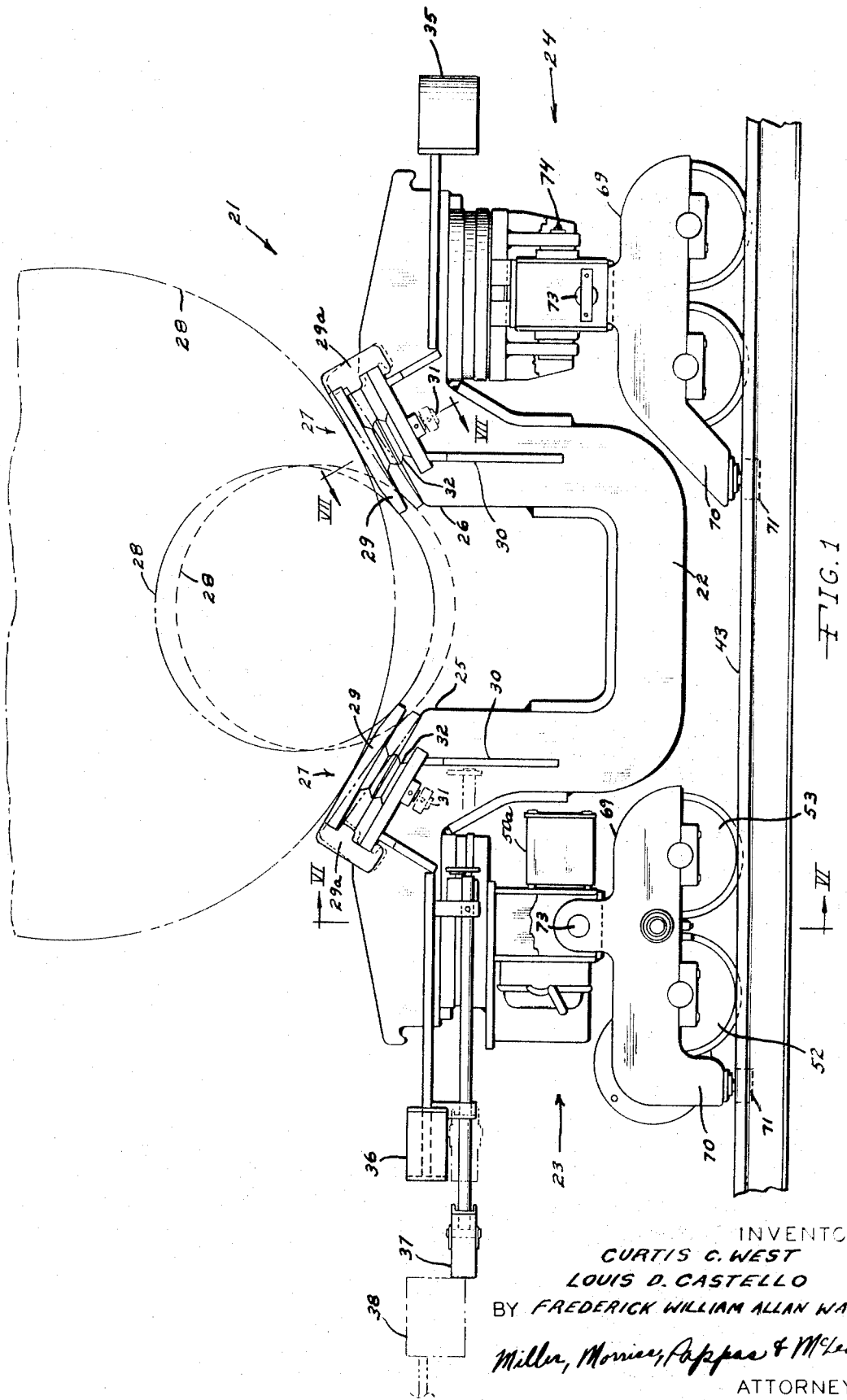
FIG. 1 is a side view of the coil car illustrating in phantom line various representative sizes of coils which can be positioned on the energy absorbing self-adjusting shock pads.

As shown in FIG. 1, a rail type coil car 21 is provided having a substantially U-shaped coil support frame 22 which is supported on forward and rear bolster assemblies 23 and 24, respectively. Although not shown, the coil car 21 can selectively be provided with wheels for movement of the car independently of a track system.

The U-shaped coil support frame 22 is provided with forward and rear spaced-apart coil support shoulders, 25 and 26, respectively. Each of the spaced-apart support shoulders, 25 and 26, respectively, are provided with a pair of spaced-apart self-adjusting resilient shock pad assemblies 27 which are adapted to adjustably support steel coils 28 of varying sizes as shown in phantom line in FIG. 1.

As shown in FIGS. 1 and 7, each shock pad assembly 27 consists of a support frame 30 provided on each of the support shoulders, 25 and 26, respectively. A support plate 29 is provided on each support frame 30 and is retained by a central pin 31. A resilient compression shock pad 32 is positioned intermediate the support plate 29 and the support frame 30. This construction permits each support plate 29 to "tilt" or adjust itself in response to a steel coil positioned thereon. Further, the shock pads 32 cushion and absorb energy from loading and transporting activities so as to prevent damage to the coil car and its components, such as bearings and the like. The shock pads 32 also prevent damage to the material being carried. A retainer limit member 29a is provided on the support plate 29 and is configured to engage the support frame 30 so as to limit the distance that the plate 29 tilts to accommodate a steel coil. The tilting capability of the support plate 29 and action of the retainer limit member 29a is shown in phantom line in FIG. 1.

Each of the support shoulders, 25 and 26, are divided or slotted so as to provide slots or access paths, 33 and 34, respectively, therethrough. The combination of the slots, 33 and 34, and the U-shaped configuration of the frame 22 permits the banding or unbanding of the coil while it is resting on the shock pads 32 as shown in FIG. 1. An access area is thus provided around the entire coil whereby the banding strap and arms of the banding mechanism (not shown) can complete the banding operation without moving or otherwise handling the coil from its rest position on the coil support frame 22.

Although not specifically shown, it is within the scope of the invention to provide a coil support frame with the centerline of the U-shaped configuration at an angle to or parallel to the direction of travel of car.

A fixed rear bumper 35 is mounted on the coil support frame so as to extend rearwardly therefrom. A fixed front bumper 36 is also mounted on the forward portion of the coil car so as to extend forwardly therefrom.

A safety bumper 37 is slidably mounted on the coil support frame 22 so as to extend forwardly beyond the fixed front bumper 36.

As shown in phantom line in FIG. 1, the safety bumper 37 moves rearwardly upon contact with an obstacle 38 in the path of the coil car 21. This movement automatically trips a cut-off switch (not shown) which stops the car until the obstacle 38 is removed and the safety bumper 37 is returned to its original extended position. The electrical circuitry involved in the operation of the cut-off switch is not shown. Generally, the actuation of the cut-off switch in response to the movement of the safety bumper 37 cuts off the source of power to the drive units of the coil car. Such circuitry is well within the skill of those versed in the art and will not be described herein.

Figure 2:
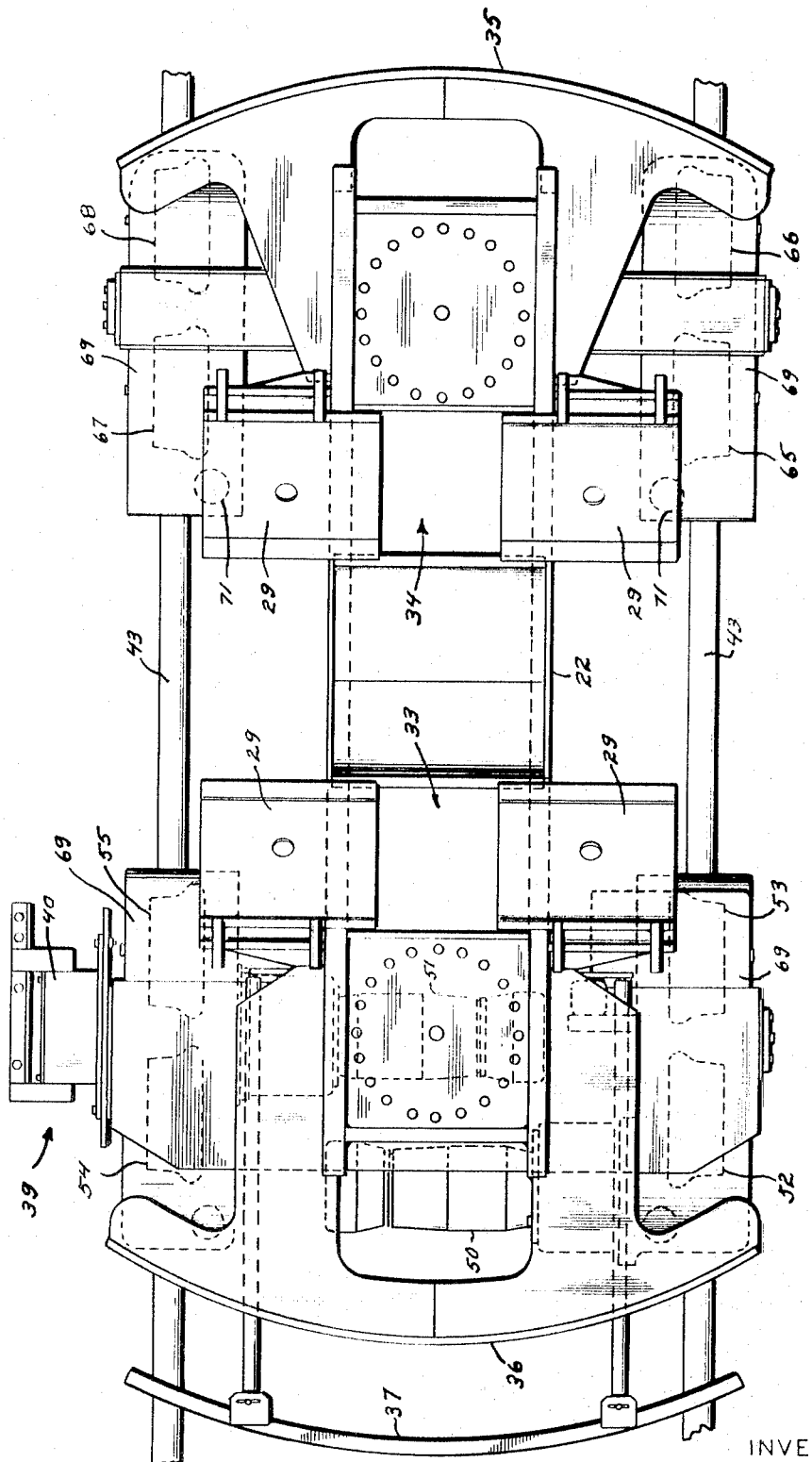
FIG. 2 is a top view of the coil car illustrating the spaced apart support shoulders and shock absorber pads which permit the banding or unbanding the coil while it is positioned on the coil car.
Figure 3:
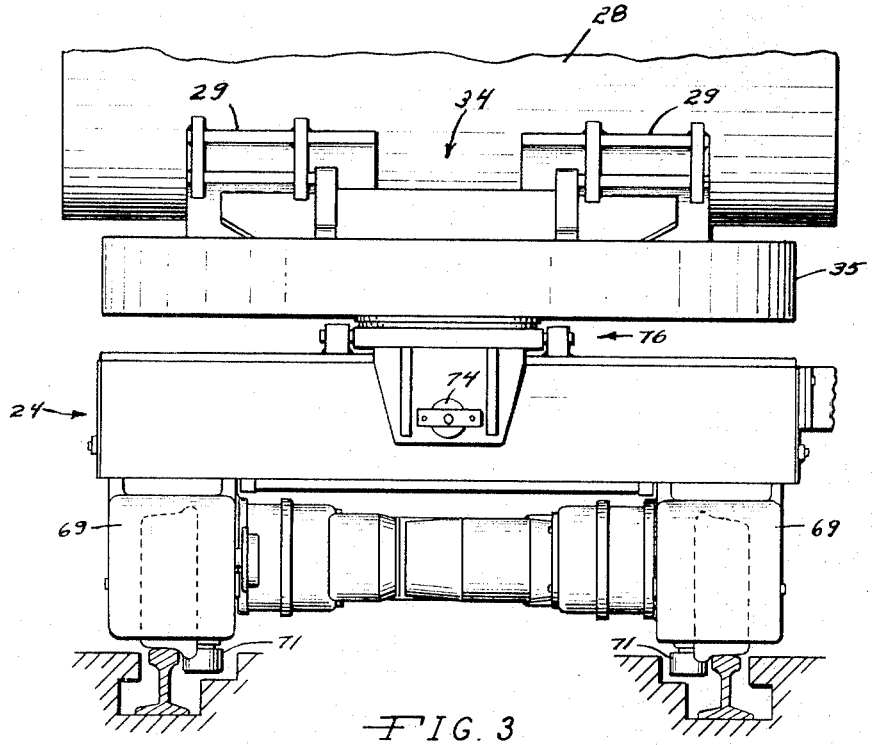
FIG. 3 is a rear view of the coil car.
Figure 4:
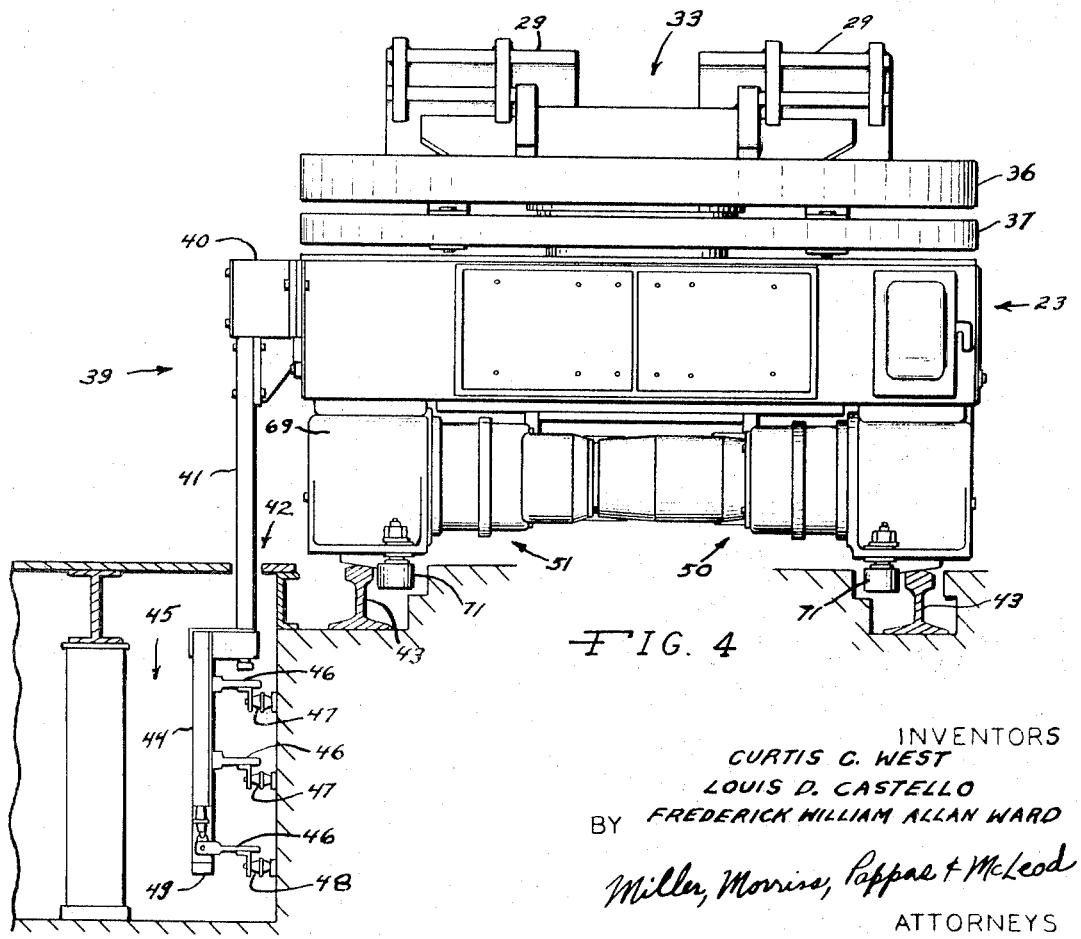
FIG. 4 is a front view of the coil car showing the dual motor drives motors whose armatures are series connected and illustrating the beneath-the surface power take-off assembly.
Figure 6:
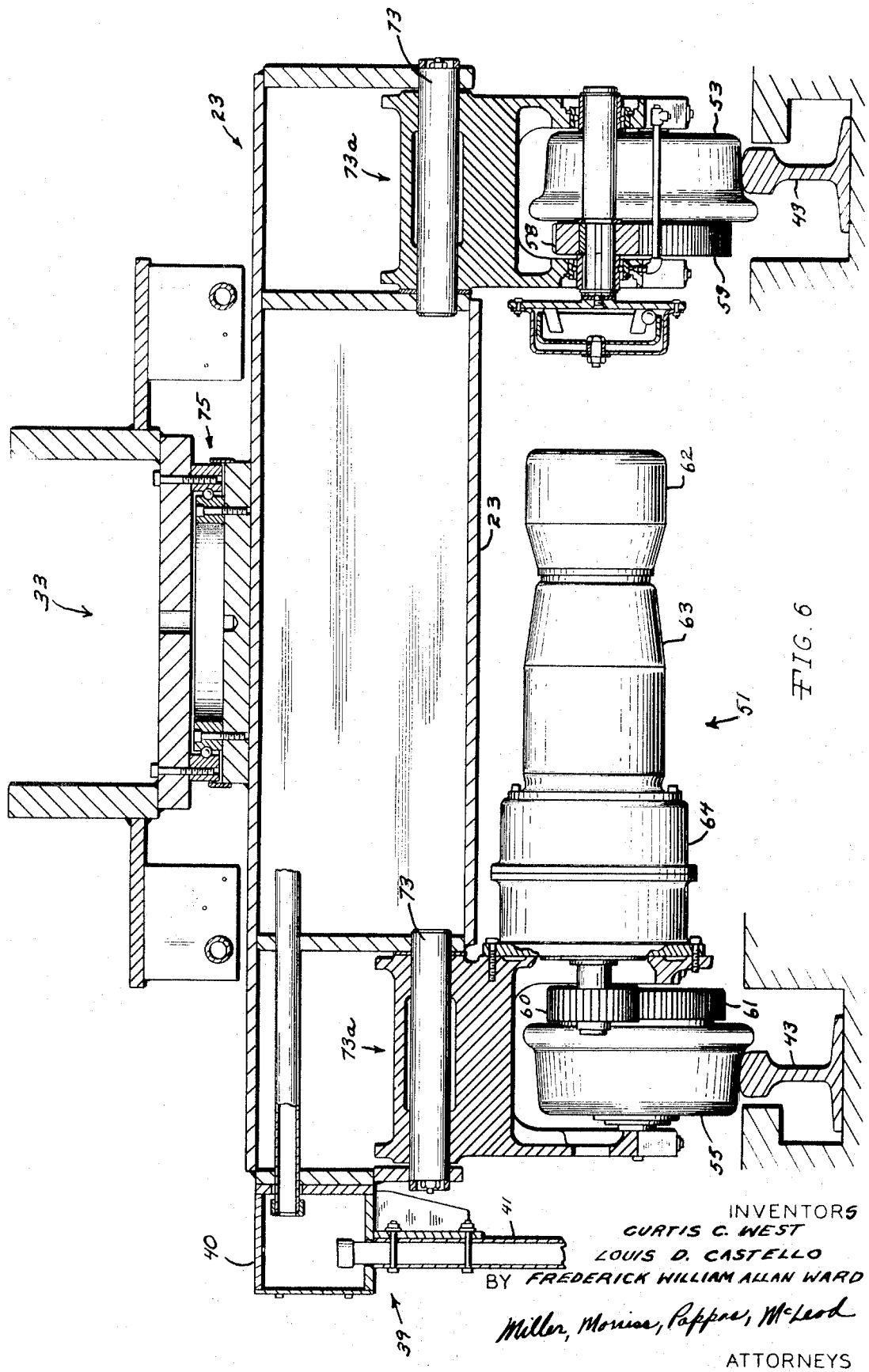
FIG. 6 is a cross sectional view of the coil car taken on line VI — VI of FIG. 1 showing one of the motor drive units.

As shown in FIGS. 2, 4 and 6, the coil car 21 is provided with a power take-off mast assembly 39. The mast assembly 39 is comprised of a mast head 40 which is mounted at the forward end of the coil car 21. A mast 41 extends downwardly through a slotted opening 42 provided in the floor adjacent to the rails 43. A shoe mast 44 is provided on the lower end of the mast 41 and extends downwardly therefrom within the trench 45 provided under the slotted opening 42. A plurality of shoes 46 are provided on the shoe mast 44 and are in contact with power rails 47 provided within the trench 45. A third rail 48 is provided for signal switch operating purposes and a plurality of switch operating magnets (not shown) can be provided along the base of the trench 45 to actuate a cut-off switch 49 at predetermined points along the track system. As shown, the cut-off switch 49 is provided at the base of the shoe mast 44.

Electrical circuitry (not shown) well known in the art is utilized within the mast assembly 39 to deliver power from the power rails 47 through the car-mounted motor controller 50a to the motor drive units 50 and 51 which drive each set of wheels on the forward bolster assembly 23. The drive units 50 and 51 are electrically connected in series so as to impart a differential action to the wheels of the forward bolster wheel assembly. As will be hereinafter described, motor drive unit 50 drives wheels 52 and 53 on one side of forward bolster assembly 23. Motor drive unit 51 drives wheels 54 and 55 on the opposite side of the forward bolster assembly 23. By virtue of the fact that the drive units 50 and 51 are series connected, they drive their respective wheels at equal rates. However, as the coil car moves through a turn, the set of wheels on the "short side" of the turn will turn more slowly, while the set of wheels on the "long side" of the turn will turn more rapidly. The electrical connection between the drive units permits one of the drive units to slow down as required by the shorter distance which is being travelled. With reference to FIG. 2, if the coil car goes into a right turn, wheels 54 and 55 will turn more slowly in response to slower drive action by the motor drive unit 51. Due to the series connection, motor drive unit 50 will automatically speed up an equal amount so as to cause wheels 52 and 53 to rotate more rapidly in order to negotiate the larger radius of turn. Thus, an electrical differential action is achieved without the need for cumbersome and expensive mechanical differentials.

As shown in the partial schematic view of FIG. 5, a drive gear 56 which is powered by the motor drive unit 50 engages and drives ring gear 57 which is provided on wheel 52. Ring gear 57 in turn engages and drives an idler pinion 58 which positioned intermediate wheels 52 and 53. The idler pinion 58 engages and drives a second ring gear 59 which is fixedly provided on wheel 53.

Due to its off-set positioning, the motor drive unit 51 directly drives a gear 60 which is positioned intermediate wheels 54 and 55 is in direct driving engagement with ring gears 61 fixedly provided on wheels 54 and 55. This relative positioning is shown in the cross-sectional view of FIG. 6 taken on line VI—VI of FIG. 1.

As further shown in FIG. 6, each of the motor drive units (51 shown) is comprised of a brake member 62, a motor member 63, and a reducer member 64. While the embodiment of the invention shown and described herein utilizes dual drive units 50 and 51, it is considered to be within the scope of the invention to utilize a single drive unit as desired. Further, it is also considered to be within the scope of the invention that each of the dual drive units drives only a single wheel on each wheel truck assembly.

As shown in the cross-sectional view of FIG. 8 taken on line VIII-VIII of FIG. 5, wheel 53 is provided with a ring gear 59 and a flange extension 72. A housing 69 is provided which houses that particular set of wheels.

Each set of wheels, 52 and 53, 54 and 55, 65 and 66 and 67 and 68, respectively are provided with housing members 69. Each housing member 69 is provided with a forward extension arm 70 which extends downwardly into close proximity to their tracks 43. A cam follower or guide roller 71 is rotatably mounted on each arm 70 so that the outer circumferential end surface of the roller 71 is proximate to and spaced apart from the side edge of rail 43. While the rails of the track system are straight, the rollers 71 do not engage the side of the rails. However, as the rails curve and the coil car goes into a turn, the guide roller 71 moves into rolling engagement with the edge of the rail on the "outside" of the turn. Thus, the function of the guide rollers 71 is to "lead" the wheels behind it around a turn so as to avoid excessive wear on the rail and on the inside of the flange extension 72 of each wheel. The rollers 71 absorb the main strain forces created between the curving track and the heavy coil car and therefore provide a relatively strain-free and wear-free rolling contact between the wheels of the coil car and the rails.

It is within the scope of the invention to have a rear extension arm and rear guide roller on each housing to allow for bi-directional travel of the coil car in certain specific job applications while providing similar strain-free operation of the wheels of the car while it is moving "backward."

As shown generally in the drawings, the coil car is provided with a pin joint suspension system which insures full eight wheel contact on the rails at all times. As shown in FIG. 6, pins 73 pivotally connect the individual wheel truck assemblies 73a to the bolster 23 so that each set of wheels 52 and 53, and 54 and 55, respectively, automatically adjust themselves to any uneven conditions and level changes in the track system. Wheels, 65 and 66, and 67 and 68, are similarly mounted on bolster 24. Further, the rear bolster frame 24 is also pivotally connected to the rear radial bearing 76 by use of a pin 74 so as to provide additional automatic self-adjusting capability to compensate for changes of rail alignments and other rail irregularities which may exist due to improper installation or changes brought about by heavy wear.

Additional versatility is imparted to the coil car by virtue of the fact that high capacity radial ball bearing assemblies 75 and 76 are provided to connect the forward and rear bolster assemblies 23 and 24, respectively, to the coil support frame 22. This skew bearing capability enhances the off center loading capacity of the coil car.

It is thus seen that a unique coil car is provided which is well adapted for the transport of heavy coiled or stacked materials from one remote location to another. Further, a plurality of such cars can be provided to create a versatile transport system having flexibility in use heretofore not found in existing conveyor systems. Accommodation of changes in production rates is easily achieved by adding or removing cars from the transport system.

Various other modifications of the invention may be made without departing from the principle thereof. Each of the modifications is to be considered as included in the hereinafter appended claims unless these claims by their language expressly provide otherwise.

Having thus set forth the nature of our invention, we claim the following:

1. In a coil car for transport of heavy coiled or stacked material, the combination comprising:
   a. a coil support frame having a substantially U-shaped configuration, said coil support frame provided with forward and rear wheel assemblies;
   b. power drive means in association with at least one of said wheel assemblies;
   c. a pair of spaced-apart coil support shoulders provided on said coil support frame;
   d. a pair of spaced-apart self-adjusting resilient shock pads provided on each of said coil support shoulders, said shock pads adapted to supportably engage coiled or stacked materials placed thereon.
   e. power cut-off switch means provided on said coil support frame in association with said power drive means, said power cut-off switch means adapted to selectively de-energize said power drive means; and
   f. a safety bumper bar slidably mounted on said coil support frame, said safety bumper bar being slidably movable upon contact with an obstacle in the path of the coil car so as to actuate said power cut-off switch means to de-energize said power drive means.

2. In the coil car of claim 1 wherein said coil support frame is provided with a power take-off mast assembly, said power take-off mast assembly adapted to engage external underground power source.

3. In the coil car of claim 1 wherein each of said coil support shoulders are provided with transverse access slots therein, said access slots permitting banding of the coiled material positioned on said shoulders.

4. In the coil car of claim 1 wherein said power drive means comprises a brake member, a motor member and a reducer member.

5. In the coil car of claim 1 wherein each of said shock pads is provided with a retainer limit member, said limit member adapted to limit the degree of tilt of said shock pads.

6. In the coil car of claim 1 wherein each of said forward and rear wheel assemblies comprise a pair of wheel truck assemblies.

7. In the coil car of claim 6 wherein said each of said wheel truck assemblies is provided with a cam follower guide roller, said guide roller adapted to engage the outer curving track rail during a turn.

8. In the coil car of claim 6 wherein said power drive means comprise a pair of electric drive units in association with one of said pairs of wheel truck assemblies, each of said electric drive units adapted to independently drive one of said wheel truck assemblies, said electric drive units being electrically connected so as to provide a differential action to said one pair of wheel truck assemblies during turns.

* * * * *